US012550835B2

(12) United States Patent
Yang

(10) Patent No.: US 12,550,835 B2
(45) Date of Patent: Feb. 17, 2026

(54) PLANT CULTIVATION CONTAINER

(71) Applicant: LG ELECTRONICS INC., Seoul (KR)

(72) Inventor: Mina Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/722,633

(22) PCT Filed: Nov. 2, 2022

(86) PCT No.: PCT/KR2022/016990
§ 371 (c)(1),
(2) Date: Jun. 21, 2024

(87) PCT Pub. No.: WO2023/120959
PCT Pub. Date: Jun. 29, 2023

(65) Prior Publication Data
US 2025/0063994 A1 Feb. 27, 2025

(30) Foreign Application Priority Data

Dec. 21, 2021 (KR) .................. 10-2021-0183813

(51) Int. Cl.
A01G 9/24 (2006.01)
A01G 9/02 (2018.01)
A01G 27/00 (2006.01)

(52) U.S. Cl.
CPC ............. *A01G 9/247* (2013.01); *A01G 9/028* (2013.01); *A01G 27/005* (2013.01)

(58) Field of Classification Search
CPC .......... A01G 9/247; A01G 9/028; A01G 9/02; A01G 9/029; A01G 27/00; A01G 27/005
(Continued)

(56) References Cited

U.S. PATENT DOCUMENTS 7,392,616 B1 * 7/2008 Bagby .................... A01G 27/04
47/33
8,443,547 B2 * 5/2013 Visser .................... A01G 9/086
47/87
(Continued)

FOREIGN PATENT DOCUMENTS

KR 10-2005-0024462 3/2005
KR 20050024462 A * 3/2005
(Continued)

OTHER PUBLICATIONS

International Search Report (with English Translation) and Written Opinion dated Feb. 23, 2023 issued in Application No. PCT/KR2022/016990.

(Continued)

Primary Examiner — Timothy D Collins
Assistant Examiner — Maria E Graber
(74) Attorney, Agent, or Firm — KED & ASSOCIATES

(57) ABSTRACT

A plant cultivation container, including a plurality of media in which seeds of plants or at least portions of plants are buried; a container having a medium accommodation space in which the plurality of media is accommodated and an open upper surface; a cover that covers an open upper portion of the container; and at least one separator that divides the medium accommodation space into a plurality of root accommodation spaces, and through which water may pass. The plurality of media is divided between and accommodated in the plurality of root accommodation spaces.

20 Claims, 12 Drawing Sheets

(58) Field of Classification Search
USPC .................................................. 47/65.5, 66.5
See application file for complete search history.

(56) References Cited

U.S. PATENT DOCUMENTS

| | | | | |
|---|---|---|---|---|
| 10,058,040 | B2* | 8/2018 | Daas ..................... | A01G 9/1423 |
| 11,445,667 | B2* | 9/2022 | Xin ........................ | A01G 9/027 |
| 11,503,776 | B2* | 11/2022 | Wantland ............... | A01G 9/246 |
| 11,564,364 | B2* | 1/2023 | Yi .......................... | A01G 27/003 |
| 11,576,314 | B2* | 2/2023 | Yang ..................... | A01G 9/023 |
| 11,744,196 | B2* | 9/2023 | Yang ..................... | A01G 27/04 47/60 |
| 11,771,027 | B2* | 10/2023 | Abeygunawardana ...................... | A01G 31/04 47/62 N |
| 11,980,145 | B2* | 5/2024 | Allgeier .................. | A01G 9/00 |
| 12,178,169 | B1* | 12/2024 | Cox ....................... | A01G 27/005 |
| 12,250,912 | B2* | 3/2025 | Choi ...................... | A01G 27/003 |
| 2002/0066227 | A1* | 6/2002 | Wood-Phillips ..... | A01G 9/0295 47/66.5 |
| 2007/0000170 | A1* | 1/2007 | Hempenius ............ | A01G 31/02 47/65.5 |
| 2008/0276530 | A1* | 11/2008 | Trabka ................... | A01G 9/028 47/65.5 |
| 2008/0302009 | A1* | 12/2008 | Frecon ................... | A01G 9/022 47/65.5 |
| 2010/0115834 | A1* | 5/2010 | Miyahara ............... | A01G 9/16 47/65.5 |
| 2010/0320291 | A1* | 12/2010 | Chen ..................... | A01G 27/005 138/111 |
| 2011/0005130 | A1* | 1/2011 | Huang ................... | A01G 24/46 47/65.5 |
| 2011/0113687 | A1* | 5/2011 | Berk ...................... | A01G 24/18 47/65.5 |
| 2014/0101997 | A1* | 4/2014 | Voermans .............. | A01G 22/40 47/65.5 |
| 2015/0181812 | A1* | 7/2015 | Vezina ................... | A01G 9/02 47/65.5 |
| 2015/0216131 | A1* | 8/2015 | Van Wingerden ... | A01G 9/0293 47/65.5 |
| 2015/0342127 | A1* | 12/2015 | Gallant .................. | A01G 9/021 47/65.5 |
| 2015/0353232 | A1* | 12/2015 | Kandel .................. | A47G 23/06 47/65.5 |
| 2016/0029574 | A1* | 2/2016 | He ......................... | A01G 9/023 47/66.5 |
| 2016/0198653 | A1* | 7/2016 | Kato ...................... | A01G 31/02 47/60 |
| 2019/0000130 | A1* | 1/2019 | Sleiman ................. | B65B 25/04 |
| 2020/0375127 | A1* | 12/2020 | Thoma ................... | A01G 9/247 |
| 2022/0192106 | A1* | 6/2022 | Kim ....................... | A01G 31/06 |
| 2022/0192107 | A1* | 6/2022 | Yoo ........................ | A01G 9/247 |
| 2022/0217916 | A1* | 7/2022 | Choi ...................... | A01G 31/00 |
| 2023/0017136 | A1* | 1/2023 | Bardiz ................... | A01G 7/045 |
| 2025/0063994 | A1* | 2/2025 | Yang ..................... | A01G 9/02 |

FOREIGN PATENT DOCUMENTS

| | | | |
|---|---|---|---|
| KR | 10-1009461 | | 1/2011 |
| KR | 10-2013-0061562 | | 6/2013 |
| KR | 20130061562 A | * | 6/2013 |
| KR | 10-2015-0107021 | | 9/2015 |
| KR | 10-2021-0052643 | | 5/2021 |
| KR | 10-2021-0121743 | | 10/2021 |
| KR | 20210121743 A | * | 10/2021 |

OTHER PUBLICATIONS

International Search Report dated Feb. 23, 2023.

* cited by examiner

PLANT CULTIVATION CONTAINER

CROSS-REFERENCE TO RELATED PATENT APPLICATIONS

This application is a U.S. National Stage Application under 35 U.S.C. § 371 of PCT Application No. PCT/KR2022/016990, filed Nov. 2, 2022, which claims priority to Korean Patent Application No. 10-2021-0183813, filed Dec. 12, 2021, whose entire disclosures are hereby incorporated by reference.

TECHNICAL FIELD

The present invention relates to a plant cultivation container. More specifically, the present invention relates to a plant cultivation container for a plant cultivation device.

BACKGROUND ART

A plant cultivation device refers to a device that enables cultivation of plants by artificially supplying light energy, moisture, soil, and a temperature, which are necessary for plant growth. The plant cultivation device forms a predetermined cultivation space within an environment suitable for the growth of plants, and cultivates and stores the plants in the predetermined cultivation space.

In addition, the plant cultivation device may be provided with a configuration that supplies moisture and nutrients that are necessary for the plant growth. In addition, the plants grown in the plant cultivation device may receive light energy artificially from the plant cultivation device without receiving light irradiated from the sun outside the plant cultivation device.

As a result, the user may cultivate the plants by periodically supplying moisture or nutrients during the plant cultivation stage, and the plants grown in the plant cultivation device may be grown by receiving the nutrients, the moisture, and the light energy, which are supplied from the plant cultivation device.

The plants are planted in a plant cultivation container and grown in the plant cultivation device. The plant cultivation container may contain a medium containing plant seeds or supporting a portion of the plant. One plant may be grown in one medium. As the existing plant cultivation container cultivates the plants by embedding a plurality of media in one growth space, roots of the plants become entangled with each other as the plants are grown. When roots of different crops become entangled, damage to the roots occurs during a process of separating the plants. Thus, it is difficult to separate different species grown in one growth space.

DISCLOSURE OF THE INVENTION

Technical Problem

One object of the present invention is to provide a plant cultivation container that allows multiple plants to be grown in one growth space and to be separated into individual plants after growth so as to allow various plants to be transferred to different pots and combined with each other.

One object of the present invention is to provide a plant cultivation container that allows multiple plants to be grown in one growth space and to be easily separated from each other after the growth to prevent roots from being damaged that may occur during a separation process.

The object of the present invention is not limited to the aforesaid, but other objects not described herein will be clearly understood by those skilled in the art from descriptions below.

Technical Solution

The present invention provides a plant cultivation container. In an embodiment, a plant cultivation container includes a plurality of media in which a seed of a plant or at least a portion of the plant is buried, a container part having a medium accommodation space in which the media are accommodated therein and an opened top surface, a cover part configured to cover an opened upper portion of the container part, and a separation part which is divide the medium accommodation space into a plurality of root accommodation spaces and through which water is permeable, wherein the plurality of media are divided and accommodated into the plurality of root accommodation spaces.

In an embodiment, a height of the separation part may be higher than a general height of water filled into the container part.

In an embodiment, the plant cultivation container may further include a medium cover configured to cover a top surface of each of the media so as to prevent the media from being exposed to light.

In an embodiment, the media may be provided to be separable from the plant cultivation container together with the medium cover.

In an embodiment, the separation part may be provided in the form of a partition wall disposed between one and the other of the plurality of media.

In an embodiment, the separation part may include: a first separation part configured to surround a partial region of the medium accommodation space so as to define one of the root accommodation spaces; and a plurality of second separation parts configured to connect the first separation part to a wall surface of the container part so as to define one or more of the root accommodation spaces.

In an embodiment, the separation part may be provided in a form that extends upward from the bottom.

In an embodiment, each medium of the plurality of media may be accommodated in a medium cartridge, and the medium cartridge may include a cylindrical cartridge body of which a portion or the whole is provided as the separation part and in which the media are accommodated.

In an embodiment, a height of the cartridge body may be equal to or less than a height of the container part.

In an embodiment, the plant cultivation container may further include a cartridge cover configured to cover a top surface of the cartridge body and having a cover throughhole.

In an embodiment, the cartridge cover may include a medium accommodation part configured to surround at least a portion of the media, and the media may be fixed to the medium accommodation part.

In an embodiment, a cartridge input hole through which the medium cartridge passes may be defined in the cover part so that a portion or the whole of the medium cartridge is accommodated in the container part.

In an embodiment, a diameter of the cartridge input hole may be equal to or less than that of the cartridge cover, and the medium cartridge may be inserted into the cartridge input hole and supported on a top surface of the cover part.

In an embodiment, the medium cartridge may be provided to be separable from the plant cultivation container.

A plant cultivation container according to another aspect of the prevent invention includes a plurality of media in which a seed of a plant or at least a portion of the plant is buried, a container part having a medium accommodation space in which media are accommodated therein and an opened top surface, a cover part configured to cover an opened upper portion of the container part, and a separation part disposed between one and the other of the plurality of media and provided so that water is permeable therethrough.

The present invention provides a plant cultivation device that cultivates plants by applying the plant cultivation container. A plant cultivation device according to an embodiment includes a cabinet, a bed provided inside the cabinet, a water supply part configured to supply water to the bed, and a plant cultivation container according to the foregoing various embodiments, which is seated on the bad and provided so that water of the bed flows into the medium accommodation space.

Advantageous Effects

According to various embodiments of the present invention, the multiple plants may be grown in one growth space and be separated into the individual plants after the growth to allow the various plants to be transferred to the different pots and combined with each other.

According to various embodiments of the present invention, the multiple plants may be grown in one growth space and be easily separated from each other after the growth to prevent the roots from being damaged that may occur during the separation process.

The effects of the present invention are not limited to the effects described above, and effects not mentioned can be clearly understood by those skilled in the art from this specification and the attached drawings.

MODE FOR CARRYING OUT THE INVENTION

Figure 1:
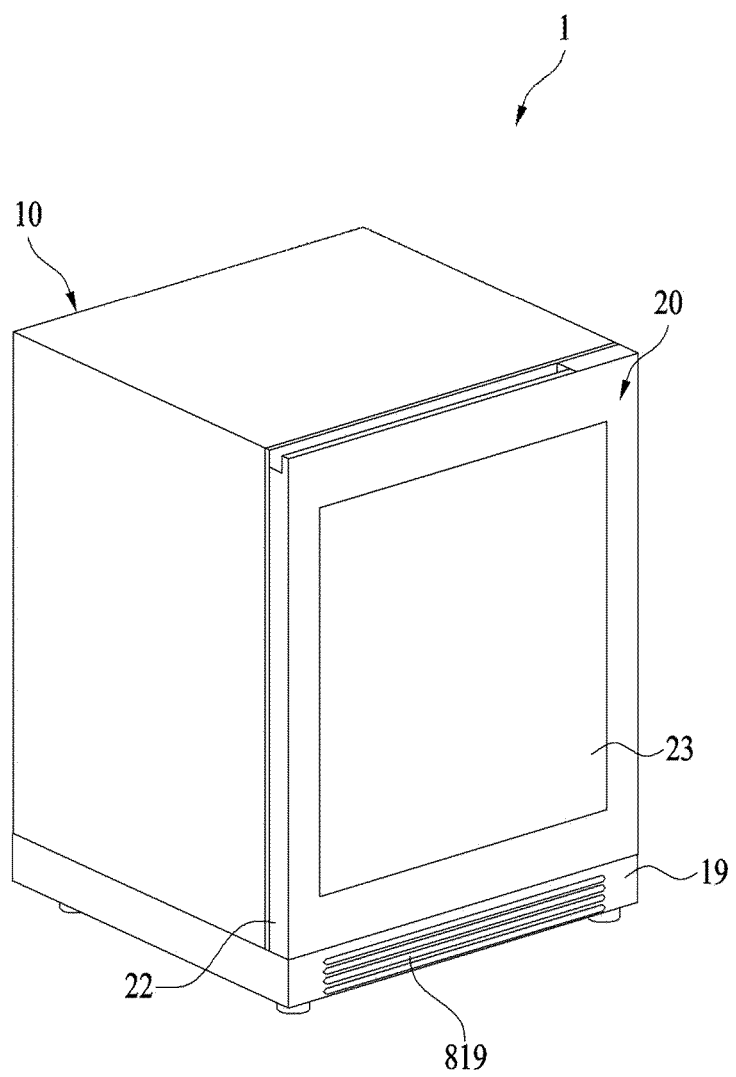
FIG. 1 is a perspective view of a plant cultivation device according to an embodiment of the present invention.

Preferred embodiments of the present disclosure will be described below in more detail with reference to the accompanying drawings. A configuration or control method of the device described below is only for explaining embodiments of the present disclosure and is not intended to limit the scope of the present disclosure, and the same reference numbers used throughout the specification indicate the same components.

Specific terms used in this specification are merely for convenience of explanation and are not used to limit the illustrated embodiments.

For example, expressions such as "same" and "is the same" not only indicate a strictly identical state, but also indicate a state in which there is a difference in tolerance or degree to which the same function is obtained.

In this specification, it will also be understood that when an element is referred to as being 'connected to' or 'coupled to' another element, it can be directly connected to the other element, or intervening elements may also be present. On the other hand, in this specification, when it is mentioned that a component is 'directly connected' to another component, it should be understood that there is no intervening elements.

In this specification, it should be understood that terms such as 'include' or 'have' are only intended to designate the existence of features, numbers, steps, operations, components, parts, or a combination thereof described in the specification, and this does not exclude in advance the presence or addition of one or more other features, numbers, steps, operations, components, parts, or combinations thereof.

For example, expressions that express relative or absolute arrangement such as "in a certain direction," "along a certain direction," "side by side," "perpendicularly," "at the center," "concentric," or "coaxial," not only strictly represents the arrangement, but also represents the state of relative displacement with a tolerance or an angle or distance that achieves the same function.

In order to explain the present disclosure, it will be described below based on a spatial orthogonal coordinate system with X, Y, and Z axes orthogonal to each other. Each axis direction (X-axis direction, Y-axis direction, and Z-axis direction) refers to both directions in which each axis extends. The '+' sign in front of each axis direction (+X-axis direction, +Y-axis direction, and +Z-axis direction) means the positive direction, which is one of the two directions in which each axis extends. The '−' sign in front of each axis direction (−X-axis direction, −Y-axis direction, and −Z-axis direction) means the negative direction, which is the other direction among the two directions in which each axis extends.

Expressions referring to directions such as "front (+Y)/rear (−Y)/left (+X)/right (−X)/up (+Z)/down (−Z)" mentioned below are defined according to the coordinate axis, but this is for explanation so that the present disclosure can be clearly understood, and of course, each direction may be defined differently depending on where the reference is placed.

The use of the terms such as 'first, second, and third' in front of the components mentioned below is only to avoid confusion about the components to which they are referred, as well as has nothing to do with the order, importance, or master-slave relationship between the components. For example, the invention that includes only the second component without the first component can also be implemented.

As used herein, the terms of a singular form may include plural forms unless referred to the contrary.

In addition, in this specification, the term 'and/or' includes any of a plurality of stated items or a combination of a plurality of stated items. In this specification, 'A or B' may include 'A', 'B', or 'both A and B'.

Figure 2:
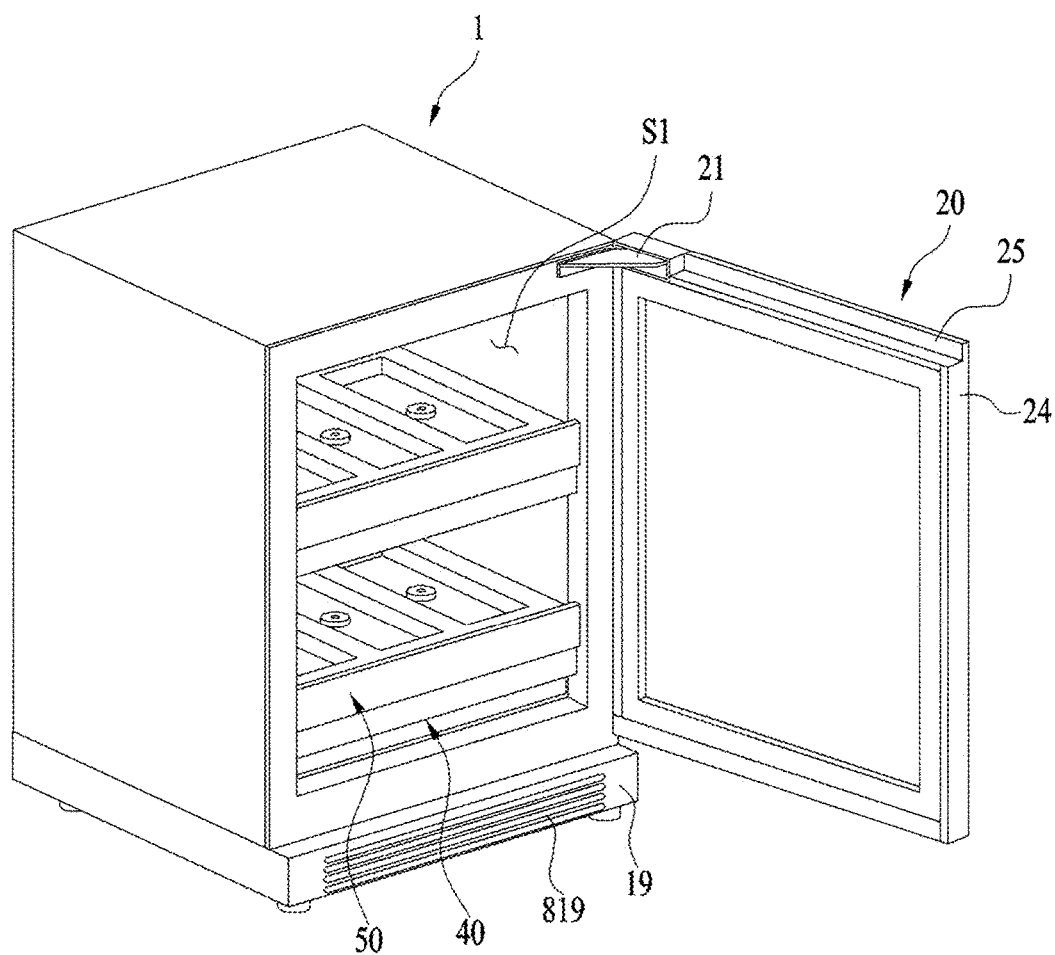
FIG. 2 is a perspective view illustrating a state in which a door is opened in the plant cultivation device according to an embodiment of the present invention.

FIG. 1 is a perspective view of a plant cultivation device 1 according to an embodiment of the present invention. FIG. 2 is a perspective view illustrating a state in which a door 20 is opened in the plant cultivation device 1 according to an embodiment of the present invention. The description will be made with reference to FIGS. 1 and 2.

The plant cultivation apparatus 1 according to an embodiment of the present invention has an outer appearance by a cabinet 10 defining a cultivation space S1 in which plants are grown therein, and a door 20 that opens and closes the cabinet 10.

The plants grown in the cultivation space S1 may be types that may be eaten by users, are easy to be grown, and do not take up a lot of space such as leafy vegetables and herbs that may be typically used in wraps or salads. In addition, the plants grown in the cultivation space S1 may be flowering plants.

The cultivation space S1 is defined inside the cabinet 10. The cabinet 10 may be provided in a rectangular parallelepiped as illustrated in the drawing, but it is not necessarily limited thereto, and may be provided in various shapes such as a cylinder or sphere if the cultivation space S1 is defined therein.

An opening is defined in a portion of the cabinet 10. The opening may be opened and closed by the door 20. The door 20 may be sized to close the opening of the cabinet 10. Hereinafter, for convenience of explanation, a direction that faces the opening is referred to as a front direction.

The door 20 may include a door panel part 23 that is at least partially transparent. The door panel part 23 is made of a transparent material such as glass or transparent plastic. The user may see the cultivation space S1 with the naked eye even when the door 20 is closed. The user may check a growth state of the plants grown in the cultivation space S1 even when the door 20 is closed. In an embodiment, the door panel part 23 may be colored or may have a colored coating, metal deposition, or a film attached thereto and be provided so that the cultivation space S1 is selectively visible to the naked eye from the outside.

The door 20 may include a door frame 22 that defines a circumference of the door 20. The door panel part 23 may be inserted into and supported by the door frame 22.

In addition, the door 20 may include a door sealing member 24 provided on one surface of the door frame 22 facing the cabinet 10 and disposed along a circumference of the opening defined by the door frame 22. When the door 20 is closed, the door sealing member 24 may be in contact with the cabinet 10 and shield the cultivation space S1. The door sealing member 24 may absorb impact force applied by the door 20 to the cabinet 10 when the door 20 is closed, to improve durability and reliability of the plant cultivation device 1. In addition, the door sealing member 24 may block a flow of air outside the cultivation space S1 and the cabinet 10 to constantly maintain a temperature and humidity of the cultivation space S1. In addition, the door sealing portion 24 may be made of an insulating material, and thus, the cabinet 10 may be insulated. Thus, the cultivation space S1 may be maintained at a temperature set by the user.

The door coupling part 21 is provided at one side of the door frame 22 to couple the door 20 to the cabinet 10. The door 20 may be rotatably coupled to the cabinet 10 through the door coupling part 21. The cultivation space S1 may be opened and closed according to the rotation of the door 20. The door coupling part 21 may be provided at one side of left and right sides of the door frame 22. Thus, the door may be opened and closed to one side of the left and right sides based on the user, thereby improving user's convenience.

The door handle 25 is provided to be stepped on the door frame 22. The door handle 25 is provided at either upper or lower ends of the door frame 22. The user may open and close the door 20 using the door handle 25. When the door coupling part 24 is provided at one side of the left and right sides of the door frame 22, the door handle 25 may be provided at the other side of the left and right sides of the door frame 22.

A lower cabinet 19 may be disposed below the cabinet 10. The lower cabinet 19 may be provided with a blowing part 819 that introduces external air to supply the external air to the cultivation space S1.

Figure 3:
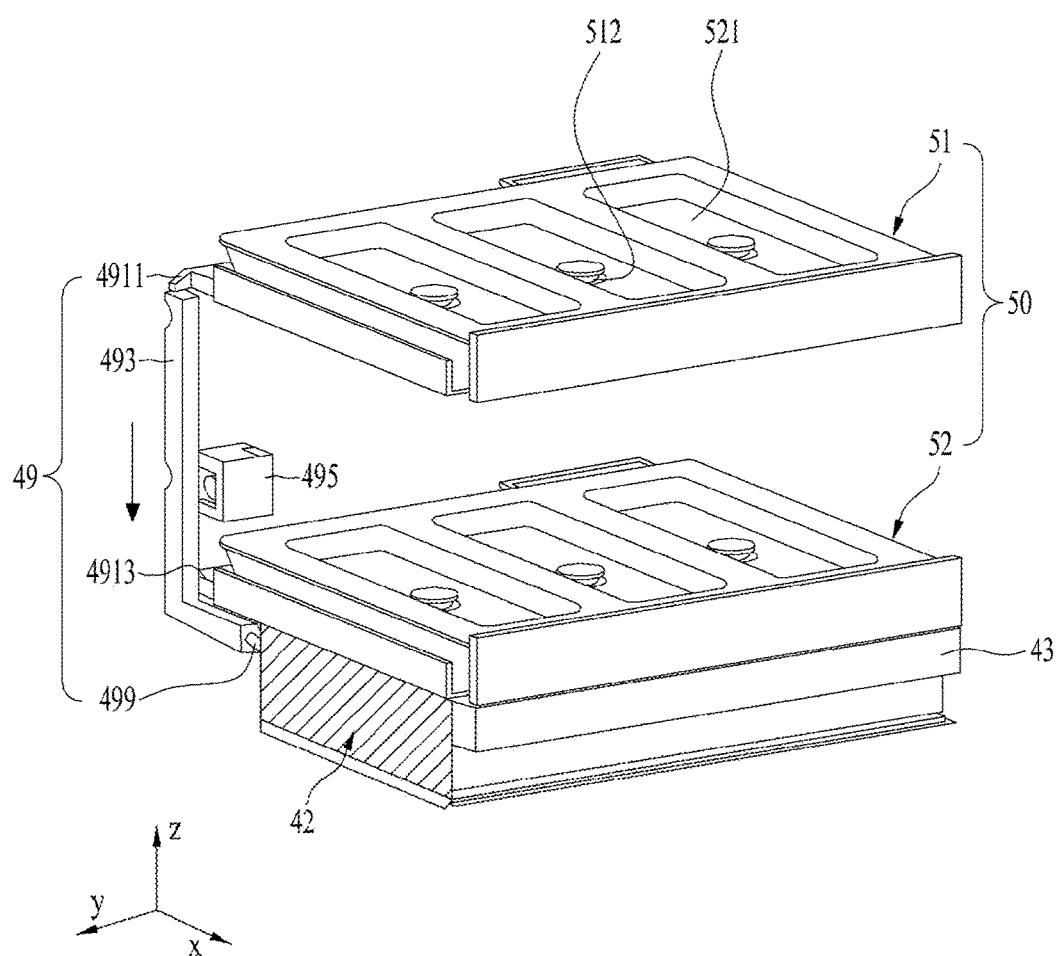
FIG. 3 is a perspective view of a bed and a discharge part in the plant cultivation device according to an embodiment of the present invention.
Figure 4:
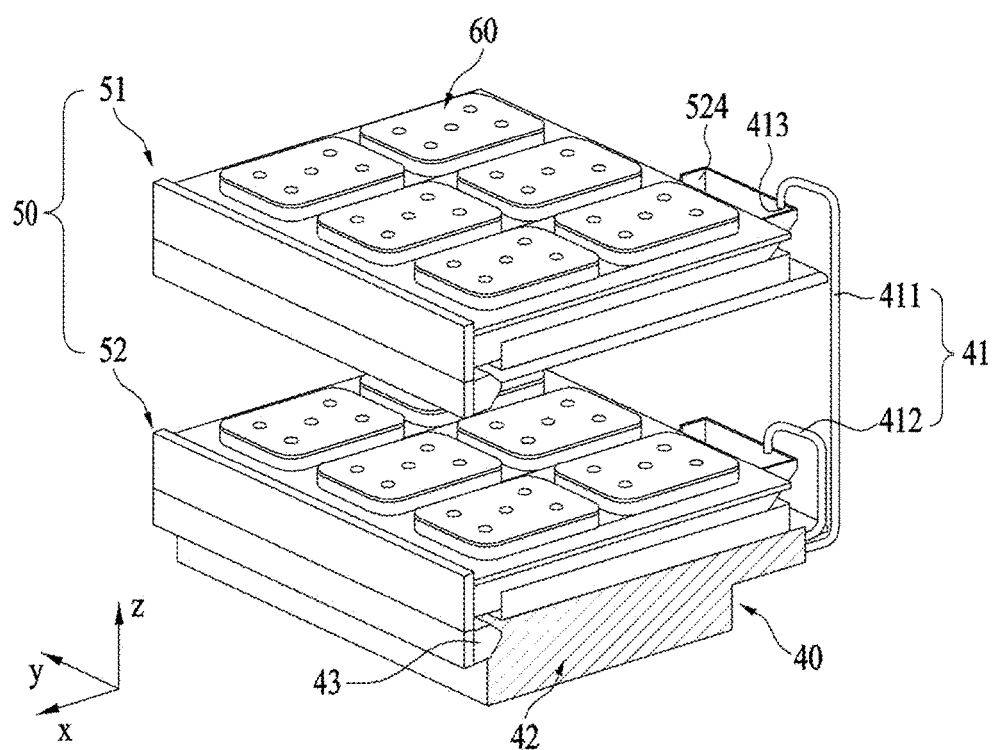
FIG. 4 is a perspective view illustrating a state in which a cultivation container is seated on the bed of the plant cultivation device according to an embodiment of the present invention.

FIG. 3 is a perspective view of the bed 50 and a discharge part in the plant cultivation device according to an embodiment of the present invention. FIG. 4 is a perspective view illustrating a state in which a cultivation container 60 is seated on the bed 50 of the plant cultivation device 1 according to an embodiment of the present invention. The description will be made with reference to FIGS. 3 and 4.

The plant cultivation device 1 according to an embodiment of the present invention may include the bed 50 provided inside the cabinet 10, and a water supply part 40 provided inside the cabinet 10 to supply water to the bed 50. The cultivation container 60 (e.g., cultivation pot) may be seated on the bed 50. The cultivation container 60 will be described in detail later.

The cultivation container 60 may be seated on an upper portion of the bed 50. A plurality of cultivation containers 60 may be seated on a plurality of beds 50. Each of the plurality of cultivation containers 60 may contain different types of plants, and thus each of different types of plants may be grown in the cultivation space S1.

The cultivation container 60 may be seated on the bed 50 so as to be separated from the bed 50. The user may open the door 20 to access the cultivation space S1 so as to seat the cultivation container 60 on the bed 50. When the growth of the plant is completed to be harvested, the cultivation container 60 may be separated from the bed 50 to easily harvest the plants in the cultivation container 60 at the outside of the plant cultivation device 1, thereby improving the user's convenience.

The cultivation container 60 may be provided in a shape extending from one side to the other side. The bed 50 may be provided so that a longitudinal direction of the cultivation container 60 is directed from a front side to a rear side of the cabinet 10.

The cultivation container 60 may be provided in plurality and may be seated on the bed 50 side by side so as to be spaced apart from each other based on a direction perpendicular to the direction in which the cultivation containers 60 extend. Hereinafter, for convenience of explanation, the direction in which the cultivation container 60 extends is defined as a first direction (x-direction), and the direction in which the cultivation containers 60 are disposed side by side is defined as a second direction (y-direction).

The bed 50 may be provided in the shape of a square plate, and although not shown in the drawing, the bed 50 may be seated on a withdrawal guide mounted on each of both surfaces inside the cabinet 10 so as to be withdrawn to the inside and outside of the cultivation space S1.

The water supply part 40 may include a water supply part 40 that supplies water to the cultivation container 60, and a storage part 43 that supplies, collects, and stores water that is necessary for the cultivation container 60. The water supply part 40 may be configured to supply the water to an upper bed 52 and a lower bed 51.

A bed water collection part 524 may be provided at one side of the bed 50 to receive the water through the supply part 41. The bed water collection part 524 may be connected to discharge passage parts 4911 and 4913 provided inside the bed, and thus, the water supplied to the bed water collection part 524 may be continuously supplied to the cultivation container 60.

A first supply passage part 411 is configured to supply the water to the upper bed 51. A second supply passage part 412 is configured to supply the water to the lower bed 52. The first water supply passage part 411 may be connected to the storage part 43 to extend upward so that the water is introduced from the storage part 43 to move to the bed water collection part 524 of the upper bed 51. The second water supply passage part 412 may be connected to the storage part 43 to extend upward so that the water is introduced from the storage part 43 to move to the bed water collection part 524 of the lower bed 52.

A discharge hole 413 of the supply part 41 may be provided at a position corresponding to the bed water collection part 524. As a result, the water supplied from the first supply passage part 411 and the second supply passage part 412 may be introduced directly into the bed water collection part 524.

The supply part 41 may be provided as a metal pipe such as stainless steel. Thus, the supply part 41 may be hygienically managed, and its shape may be firmly maintained to prevent the passage from being deformed or bent so as to be blocked and improve reliability of the water supply.

Structures of the water supply to the upper bed 51 and the lower bed 52 may be the same except for only a difference in vertical position, and the water supplied to the bed water collection part 524 may be supplied to supply moisture to the cultivation container 60 mounted on the bed 50.

The water supply part 40 may include a water supply case 42. The water supply case 42 may be provided below the lower bed 52. The water supply case 42 may be coupled to the cabinet 10.

Figure 5:
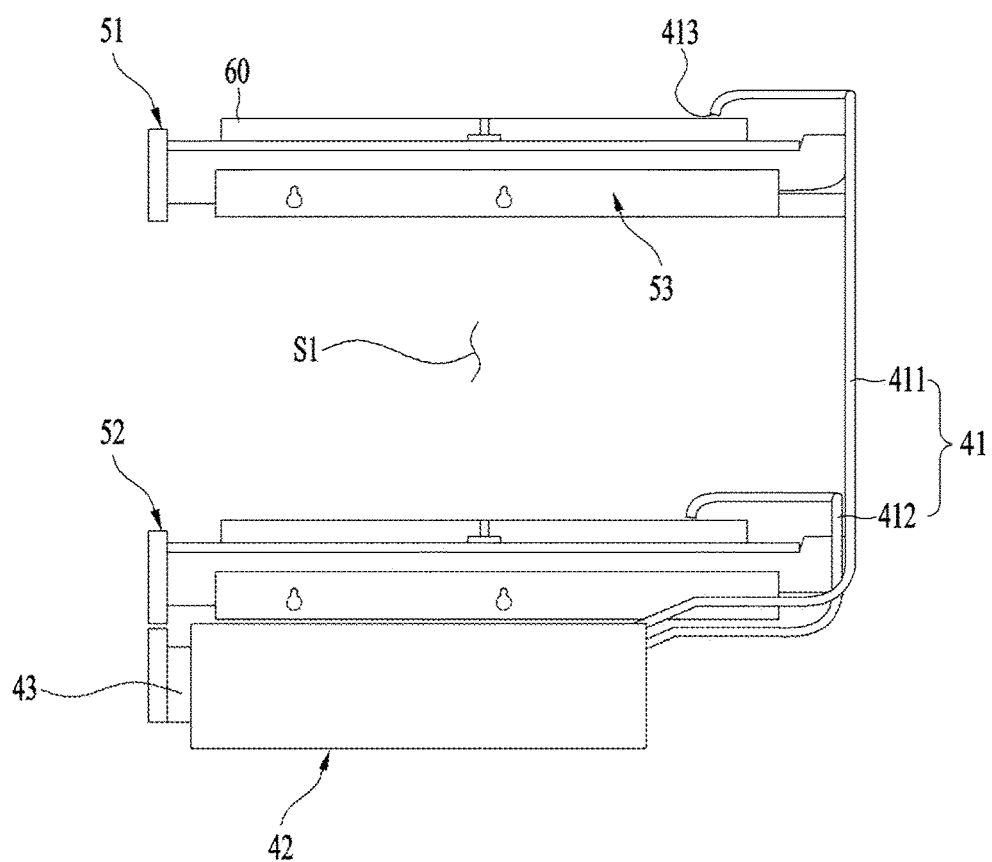
FIG. 5 is a side view of a supply part in the plant cultivation device according to an embodiment of the present invention.
Figure 6:
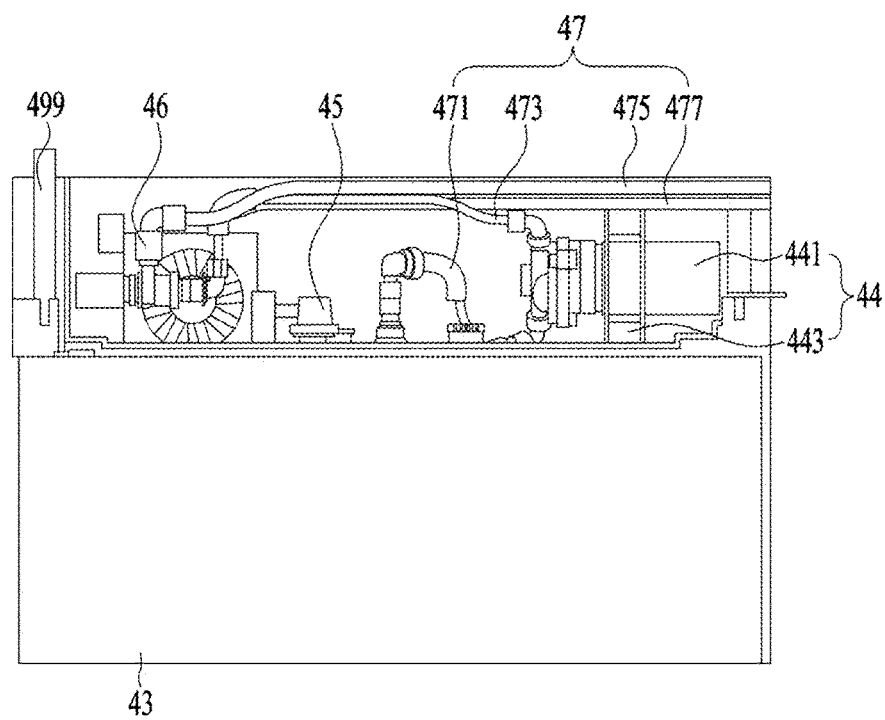
FIG. 6 is a top view of the inside of a water supply part in the plant cultivation device according to an embodiment of the present invention.

FIG. 5 is a side view of the supply part in the plant cultivation device according to an embodiment of the present invention. FIG. 6 is a top view of the inside of the water supply part in the plant cultivation device according to an embodiment of the present invention. This will be explained with further reference to FIGS. 5 and 6.

The water supply part 40 may include a water supply case 42, components disposed inside the water supply case 42, and pipes connected to the components. The storage part 43, a supply pump part 44, a flow sensor 45, a branch valve 46, and a connection passage 47 may be provided inside the water supply case 42. Due to the water supply case 42, the storage part 43, the supply pump part 44, the flow sensor 45, and the branch valve 46 may not be exposed to the outside to improve reliability of the water supply part 40, and also, the outer appearance thereof may be provided neatly.

The water supply part 40 includes the storage part 43 that stores the water supplied to the plants, and the supply pump part 44 that is connected to the storage part 43 to pump the water from the storage part 43 to the supply part 41.

The storage part 43 may be mounted inside the cabinet 10 to be withdrawable and removable in the front and rear direction and may have a detachable structure. Thus, the storage part 43 may have a structure which easily supplies water and is easily cleaned and maintained.

The supply pump part 44 includes a pump 441 provided to pump water to the supply part 41. In addition, the supply pump part 44 may further include a pump support part 443 to support the pump 441 on the cabinet 10. A nutrient solution that is necessary for the plants may be stored in the storage part 43, and the water in the storage part 43 may be supplied to the supply part 41 through the first connection passage 471 connected to the pump 441.

The flow sensor 45 detects a flow rate of the supplied water. The flow sensor 45 prevents excessive supply of water to the cultivation container 60 to overflow. An amount of water supplied to the cultivation container 60 may be adjusted by constant water supply through the flow sensor 45. The flow sensor 45 may supply an optimal amount of water to the cultivation container 60 for each stage of the plant growth to prevent excessive moisture from being stored in the cultivation container 60. As a result, the cultivation container 60 may be kept clean at all times, and humidity in the bed 50 and the cultivation space S1 may be maintained appropriately.

The branch valve 46 may be opened when the pump 441 is driven so that water is supplied toward the supply part 41. The branch valve 46 may be connected to a plurality of passages according to the number of passages provided so that the supply part 41 corresponds to the number of beds 50. The storage part 43 and the pump 441 may be connected to each other by a first connection passage 471. The pump 441 and the branch valve 46 may be connected to each other by a second connection passage 473. The branch valve 46 may be connected to a third connection passage 475 connected to the first supply passage part 411. In addition, the branch valve 46 may be connected to a fourth connection passage 477 connected to the second supply passage part 412.

The water supplied from the second connection passage 473 moves to each of the third connection passage 475 and/or the fourth connection passage 477 by the branch valve 46. The water supplied to the third connection passage 475 is supplied to the first supply passage part 411. The water supplied to the fourth connection passage 477 is supplied to the second supply passage part 412. The water in the storage part 43 may be supplied to the cultivation container 60 and/or the bed 50 through the branch valve 46 due to an operation of the pump 441.

The discharge part 49 is provided to collect water discharged from the cultivation container 60 so as to be returned to the storage part 43. The discharge portion 49 may include discharge passage parts 4911 and 4913 that communicate with a seating communication hole 512 of the bed 50 and collect water from a medium accommodation space S2, which will be described later. The discharge passage parts 4911 and 4913 are connected to the storage part 43 to collect the water inside the cultivation container 60. The discharge connection passage 493 connects the discharge collection passage 499 to the discharge passage parts 4911 and 4913 to provide a passage through which the collected water moves. The discharge connection passage 493 may extend downward from an upper portion. Each of the first discharge passage 4911 and the second discharge passage 4913 may be connected to the discharge connection passage 493. The discharge collection passage 499 is connected to the storage part 43. The discharge collection passage 499 guides water to be collected from the discharge connection passage 493 and stored in the storage part 43. At least a portion of the discharge collection passage 499, which communicates the discharge connection passage 493 and the storage part 43, may be provided inside the water supply case 42 and connected to the storage part 43.

The discharge part 49 may include a discharge pump part 495 that is connected to the discharge connection passage 493 to pump the water collected on the discharge connection passage 493 to the storage part 43. When the discharge pump part 495 operates, the water in the medium accommodation space S2, which will be described later, may be collected to the discharge part 49. When the discharge pump part 495 stops the operation, the water in the medium accommodation space S2 may not be collected to the discharge part 49.

Figure 7:
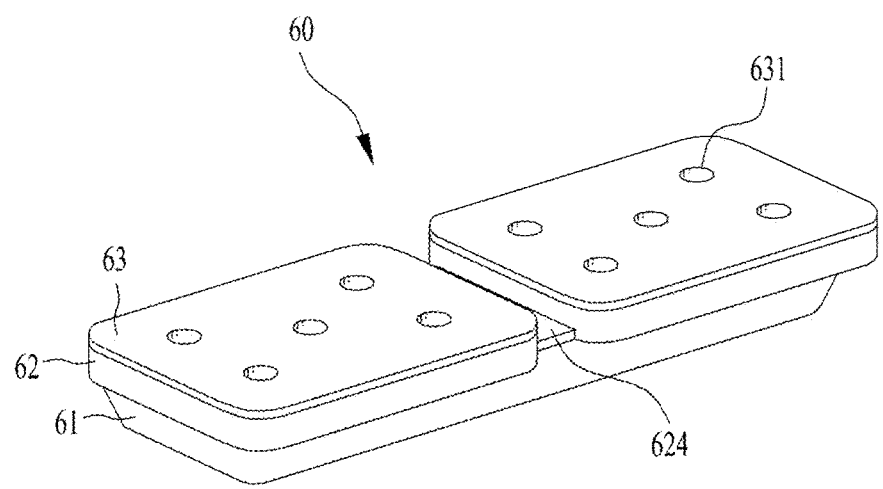
FIG. 7 is a perspective view of the cultivation container applied to the plant cultivation device according to an embodiment of the present invention.
Figure 8:
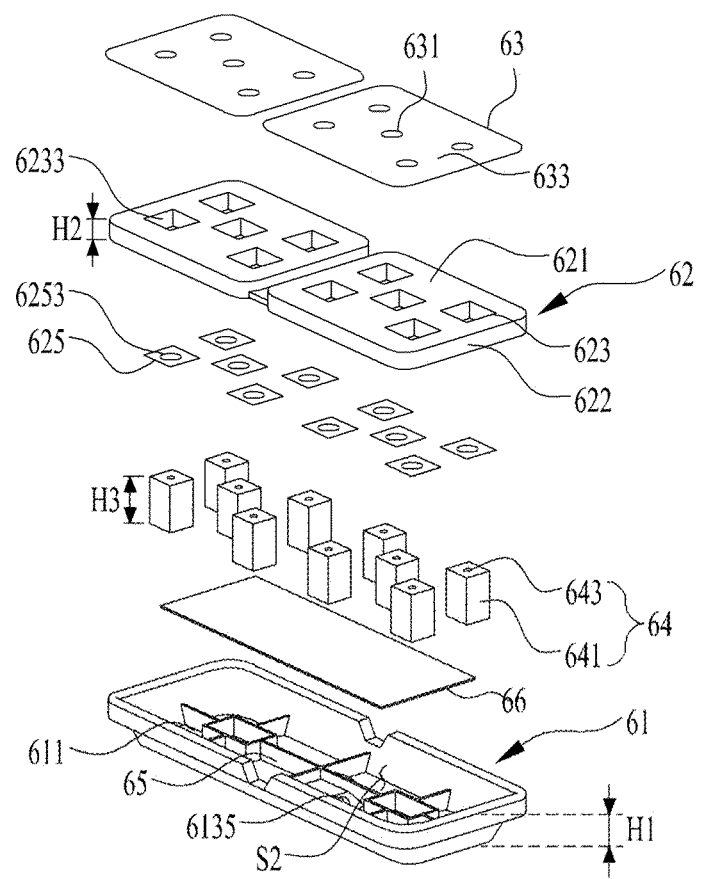
FIG. 8 is an exploded view of the cultivation container applied to the plant cultivation device according to an embodiment of the present invention.

FIG. 7 is a perspective view of the cultivation container 60 applied to the plant cultivation device 1 according to an embodiment of the present invention, and FIG. 8 is an exploded view of the cultivation container 60 applied to the plant cultivation device 1 according to an embodiment of the present invention. The cultivation container 60 according to an embodiment of the present invention will be described with reference to FIGS. 7 and 8.

The cultivation container 60 may include a container part 61 that is seated on the bed 50 and has an opened upper portion, and a cover part 62 that shields the opened upper portion of the container part 61.

The container part 61 is provided to have the opened upper portion. In order to be seated on the bed 50, the container part 61 may be provided in a size and shape corresponding to the bed seating part 521 provided on the top surface of the bed 50. The container part 61 may have a size set to be accommodated in the bed seating part 521. The user may select the cultivation container 60 in which the plant desired to be cultivated is sown to seat the cultivation container 60 at a desired position on the bed 50, thereby beginning the cultivation of the plant.

The container part 61 may include a bottom surface 611 of the cultivation container. The container part 61 has a sidewall extending from the bottom surface 611 to a predetermined height H1. The container part 61 may define a medium accommodation space S2 for accommodating the medium 64 therein. A discharge hole 6135 may be defined in the container part 61 so that the water in the medium accommodation space S2 is discharged to the discharge passage part 512. The discharge hole 6135 may be provided on the bottom surface 611 of the container part 61 to communicate with the discharge passage part 512 provided in the bed 50. The water in the medium accommodation space S2 may be introduced from the water supply part 40 through the discharge hole 6135 or may be collected again to the water supply part 40.

A cultivation filter 66 may be provided on the bottom surface 611 of the cultivation container 60. The cultivation filter 66 filters foreign substances in the water discharged from or introduced into the discharge hole 6135. The foreign substances filtered by the cultivation filter 66 may be a portion of the medium 64 generated during the plant growth process or may be a portion of the roots of the plant. The cultivation filter 66 is provided to shield the discharge hole 6135 and may prevent the foreign substances that may be generated in the medium accommodation space S2 from being introduced into the water supply part 40.

A separation membrane 65 divides the medium accommodation space S2 into a plurality of spaces. The separation membrane 65 is provided as an example of the separation part. The separation membrane 65 is made of a material that allows water to pass therethrough, but prevents the plant roots from passing therethrough. For example, a mesh material may be applied as the separation membrane 65. Alternatively, the separation membrane 65 may have holes through which water passes. A height of the separation membrane 65 may be provided to be higher than a height of the supplied water. Although the separation membrane 65 separates the medium accommodation space S2, the separation by the separation membrane 65 may not separate the growth space. The separation membrane 65 serves to prevent entanglement of the roots between the plants of each medium 64 although each medium 64 shares the growth space. If the entanglement of the roots between the plants is prevented by the separation membrane 65, one medium 64 may be easily separated from the cultivation container 60 when the plants are transplanted later. A more detailed description in this regard will be provided later.

The medium 64 is accommodated inside the container part 61. The medium 64 is provided in the medium accommodation space S2 defined by the container part 61. The medium 64 contains seeds of the plant. In addition, at least a portion of the grown plants are embedded in the medium 64. The roots of the plant may pass through the medium 64 to receive the nutrient solution. The medium 64 may extend from the bottom surface 611 of the container part 611 toward the cover part 62 to a predetermined height H3. The height H3 of the medium 64 is set to a height that is appropriate for accommodation in the container part 61.

The medium 64 may contain nutrients that are necessary for the plant growth and may be configured to allow the plant growth to proceed at an appropriate rate as long as water is supplied, even if no additional nutrients are supplied.

The medium 64 includes a medium body 641 that defines an outer appearance of the medium 64. The medium body 641 defines a body of the medium 64. A medium hole 643 in which the seeds of the plant are embedded is provided at an upper side of the medium body 641. The medium 64 may be made of various materials that absorb the water stored in the medium accommodation space S2 to supply the water to the seeds or the roots inside the medium 64. The medium 64 is a composition that allows the roots of the plants to be grown and supported. The medium 64 may vary in material, shape, and size depending on characteristics of the crop.

A medium cover 625 may be disposed on an upper portion of the medium body 641. The medium cover 625 is provided with an area that is sufficient to cover the top surface of the medium 64. The medium cover 625 blocks the medium 64 from being exposed to the outside. For example, since the medium 64 is maintained in a wet state, when exposed to external air and light emitted by a light-emitting part (not shown), reproduction of microorganisms in the water and medium may be activated to adversely affect the growth of the plant. The medium cover 625 may shield the top surface of the medium 64 to prevent the medium 64 from being exposed to the outside. As a result, an occurrence of green algae or other phenomena in the medium 64 may be reduced. The medium cover 625 may also serve as covering soil to maintain moisture in the seeds.

A cover through-hole 6253 may be defined in the medium cover 625. The cover through-hole 6253 exposes at least a portion of the top surface of the medium 64. The cover through-hole 6253 is defined at a position corresponding to the discharge hole 643. For example, a center of the cover through-hole 6253 may be provided to correspond to a center of the discharge hole 643.

The seeds embedded in the plant medium hole 643 may be germinated, and a stem of the plant may be grown to an upper portion of the cover part 62 by passing through the cover through-hole 6253. Thus, for smooth growth of the plants, a diameter of the cover through-hole 6253 may be defined to be larger than a diameter of the medium hole 643. That is, when the cultivation container 60 is viewed from the top, the cover through-hole 6253 may be defined in an expanded shape along a radial direction of the discharge hole 643. The diameter of the cover through-hole 6253 may be appropriately designed in consideration of the size of the plant being grown.

The cover part 62 covers the medium accommodation space S2 of the container part 61. The cover part 62 covers the opened upper portion of the container part 61. The cover part 62 may be coupled to the container part 61. Since the water supplied to the medium 64 is stored in the medium accommodation space S2, when exposed to the external air and light emitted by a light-emitting part (not shown), the reproduction of the microorganisms in the water may be activated to adversely affect the growth of the plant. In order to prevent this phenomenon, the cover part 62 may be configured to shield the medium accommodation space S2 of the container part 61, thereby preventing the medium accommodation space S2 from being exposed to the outside of the cultivation container 60. That is, due to the cover part 62, the water stored inside the medium accommodation space S2 may be prevented from being exposed to the light emitted by the light-emitting part (not shown) provided at the upper portion of the cultivation container 60, thereby preventing the water from being in contact with the external air. In addition, due to the cover part 62, the roots of the plants grown in the medium 64 are prevented from being exposed to (the) light-emitting part to improving the plant growth.

The cover part 62 may be coupled to be press-fitted with the container part 61. However, a method for coupling the cover part 62 to the container part 61 is not intended to be limited to the proposed method.

The cover part 62 may include a medium accommodation part 623 which is provided at a position corresponding to the medium 64 and into which an upper end of the medium 64 is inserted. The media accommodation part 623 may be provided in the top surface 621 of the cover part 62. A side surface 622 of the cover part 62 may have a predetermined height H2 to extend downward. The media accommodation part 623 may be provided to have a height equal to the height H2 of the cover part 62 so as to accommodate an upper end of the media 64. When the cover part 62 is coupled to the container part 61 by the medium accommodation part 623, the position of the medium 64 may be fixed inside the container part 61.

Each of the medium 64 and the media accommodation part 623 may be provided in plurality. The number of media accommodation parts 623 may be provided in number corresponding to the number of media 64. Alternatively, in order to fix the position of the medium 64, the number of medium accommodation parts 623 may be provided to be greater than that of at least the medium 64.

The media accommodation part 623 may be disposed at the center of the top surface of the cover part 62. In addition, a plurality of media accommodation parts 623 may be disposed along a circumference of the cover part 62. An arrangement of the media accommodation part 623 is not limited to the illustrated and described embodiments. The number, arrangement, and spaced distance of the plurality of medium accommodation parts 623 may be appropriately designed depending on the type of plant being cultivated.

The cultivation container 60 may further include a marker part 63. The marker part 63 may be provided on the top surface of the cover part 62. The seed name may be written on the marker part 63. The marker part 63 is provided so that the seed name of the plant is written so that the type of plant grown in the cultivation space S1 is easily recognized.

The marker part 63 may be provided to cover the top surface of the cover part 62. As shown in the drawing, the marker part 63 may be provided in plurality on the top surface of the cover part 62. The marker part 63 may be coupled to the remaining area of the cover part 62 excluding the cover coupling part 624. When the cultivation container 60 is viewed from the top of the cultivation container 60, the top surface 633 of the marker part 63 is exposed, and the top surface of the cover part 62 except for the cover coupling part 624 may not be exposed.

The marker part 63 pass at a position corresponding to the cover through-hole 6253 to provide a marker hole 631 that is smaller than a diameter of the cover through-hole 6253. The plants may pass through the marking hole 631 and grown into the upper portion of the cultivation container 60.

Figure 9:
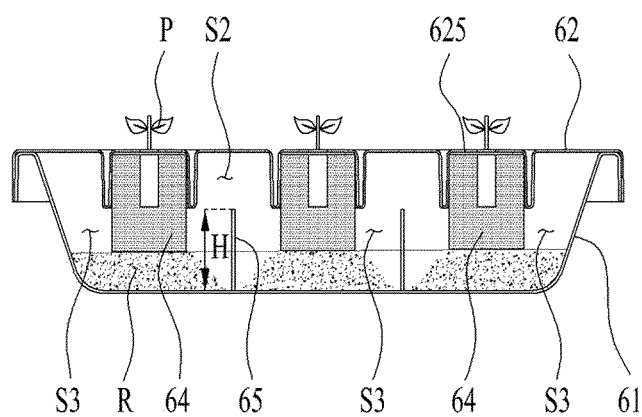
FIG. 9 is a cross-sectional view of the cultivation container 60 in a state in which plants embedded in media are grown and taken root.
Figure 10:
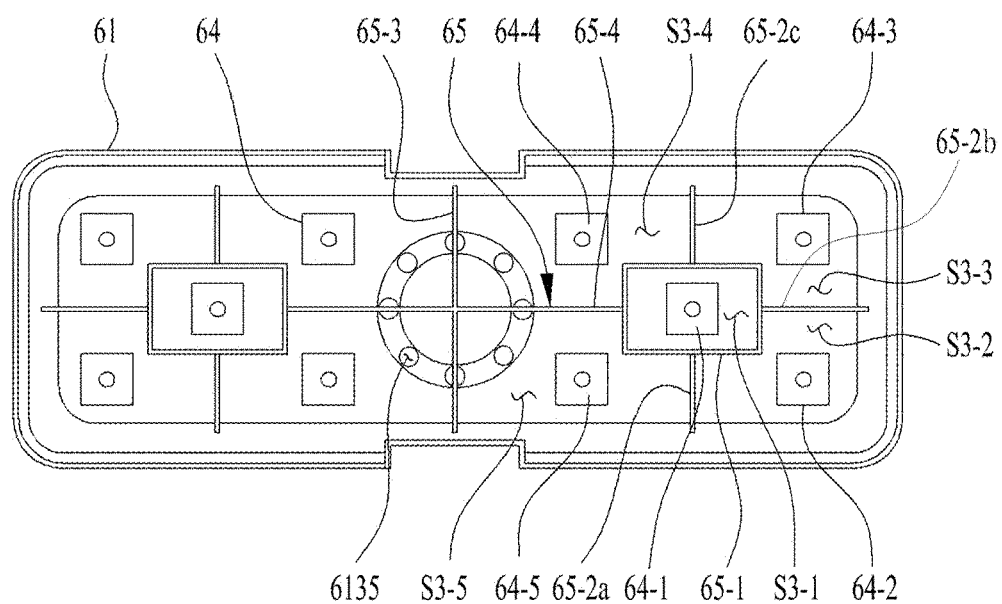
FIG. 10 is a plan view illustrating a container part of the cultivation container when viewed from the top.

FIG. 9 is a cross-sectional view of the cultivation container 60 in a state in which the plants embedded in media are grown and taken the root. FIG. 10 is a plan view illustrating a container part 61 of the cultivation container 60 when viewed from the top. This will be described with reference to FIGS. 9 and 10.

The separation membrane 65 prevents roots R of the plants grown on different media 64 from being entangled with each other. The separation membrane 65 is made of a material that allows water to pass therethrough, but prevents the plant roots from passing through the separation membrane 65. This means that the plant roots are prevented from passing through the separation membrane 65, which means that plant roots do not easily pass therethrough. In other words, the plant roots are inhibited from passing through the separation membrane 65, which means that most of the roots R are allowed to be grown mainly inside the separation membrane 65 without passing through the separation membrane 65. The separation membrane 65 is provided in a shape extending upward from the bottom surface 611 of the container part 61. The separation membrane 65 divides the medium accommodation space S2 defining one growth space into a plurality of root accommodation spaces S3. In an embodiment, the separation membrane 65 divides the medium accommodation space S2 into the plurality of root accommodation spaces S3 so that one medium 64 is accommodated in one root accommodation space S3. A height H4 of the separation membrane 65 is provided higher than a general height of water filled in the container part 61. The height H4 of the separation membrane 65 may prevent the roots R of the plant from moving into the other root accommodation space. Although the separation membrane 65 separates the medium accommodation space S2 into the plurality of root accommodation spaces, the separation by the separation membrane 65 does not separate the growth space. The separation membrane 65 serves to prevent entanglement of the roots between the plants of each medium 64 although each medium 64 shares the growth space. If the entanglement of the roots between the plants is prevented by the separation membrane 65, one medium 64 may be easily separated from the cultivation container 60 when the plants are transplanted later.

In an embodiment, the separation membrane 65 may be provided in the form of a partition wall. The description will be made with reference to the embodiment of FIG. 10. The separation membrane 65 includes a first separation membrane 65-1 that surrounds a portion of the medium accommodation space S2 and defines a first root accommodation space S3-1. The first medium 64-1 is accommodated in the first root accommodation space S3-1. The first separation membrane 65-1 is shaped to surround the first medium 64-1 disposed at a center thereof. The separation membrane 65 includes second separation membrane 65-2a, 65-2b, and 65-2c connecting the first separation membrane 65-1 to the sidewall of the container part 61. In an embodiment, the second separation membranes 65-2a, 65-2b, and 65-2c include a second-1 separation membrane 65-2, a second-2 separation membrane 65-2b, and a second-3 separation membrane 65-2c. The first separation membrane 65-1, the second-1 separation membrane 65-2a, the second-2 separation membrane 65-2b, and the sidewall of the container part 61 are combined with each other to define a second root accommodation space S3-2. The first separation membrane 65-1, the second-2 separation membrane 65-2b, the second-3 separation membrane 65-2c, and the sidewall of the container part 61 are combined with each other to define a third root accommodation space S3-3.

The separation membrane 65 further includes a third separation membrane 65-3 that crosses the center of the container part 61 in a short direction. One side and the other side divided by the third separation membrane 65-3 have a symmetrical arrangement structure of the separation membrane 65 and the medium 64. The separation membrane 65 further includes a fourth separation membrane 65-4 connecting the first separation membrane 65-1 to the third separation membrane 65-3. The first separation membrane 65-1, the second-third separation membrane 65-2b, the third separation membrane 65-3, the fourth separation membrane 65-4, and the sidewall of the container part 61 are combined with each other to define a fourth root accommodation spaces S3-4. The first separation membrane 65-1, the third separation membrane 65-3, the fourth separation membrane 65-4, the sidewall of the container part 61, and the second-1 separation membrane 65-2 are combined with each other to define a fifth root accommodation spaces S3-5.

The first medium 64-1 is accommodated in the first root accommodation space S3-1. The second medium 64-2 is accommodated in the second root accommodation space S3-2. The third root accommodating space S3-3 accommodates the third medium 64-3. The fourth root accommodating space S3-4 accommodates the fourth root 64-4. The fifth root accommodating space S3-5 accommodates the fifth medium 64-5.

In other words, the first separation membrane 65-1 is disposed to surround the first medium 64-1. The second-1 separation membrane 65-2c is disposed between the fifth medium 64-5 and the second medium 64-2. The second-2 separation membrane 65-2b is disposed between the second medium 64-2 and the third medium 64-3. The second-3 separation membrane 65-2c is disposed between the third medium 64-3 and the fourth medium 64-4. The fourth separation membrane 65-4 is disposed between the fourth medium 64-4 and the fifth medium 64-5.

the usage aspect of the described embodiment will be described. The user accommodates the plant cultivation container 60 in the plant cultivation device 1 to grow the plants. The user may move plants that have been grown for ornamental purposes to a separate pot. According to an embodiment of the present invention, since the roots of crops are not tangled by the separation membrane 65, the roots may be easily separated and transplanted individually. In addition, although the roots are not tangled by the separation membrane 65, the growth environment in the medium storage space S2 is shared, and thus, the cultivation is possible through one bed 50 provided in the plant cultivation device 1.

FIGS. 11 to 14 are views of a cultivation container 160 according to another embodiment of the present invention. Hereinafter, the cultivation container 160 according to another embodiment of the present invention will be described with reference to FIGS. 11 to 14. In explaining the cultivation container 160 with reference to the above-described components, the same or similar components are given the same reference numerals as the previously described components, and the description is replaced with the previously described components.

Figure 11:
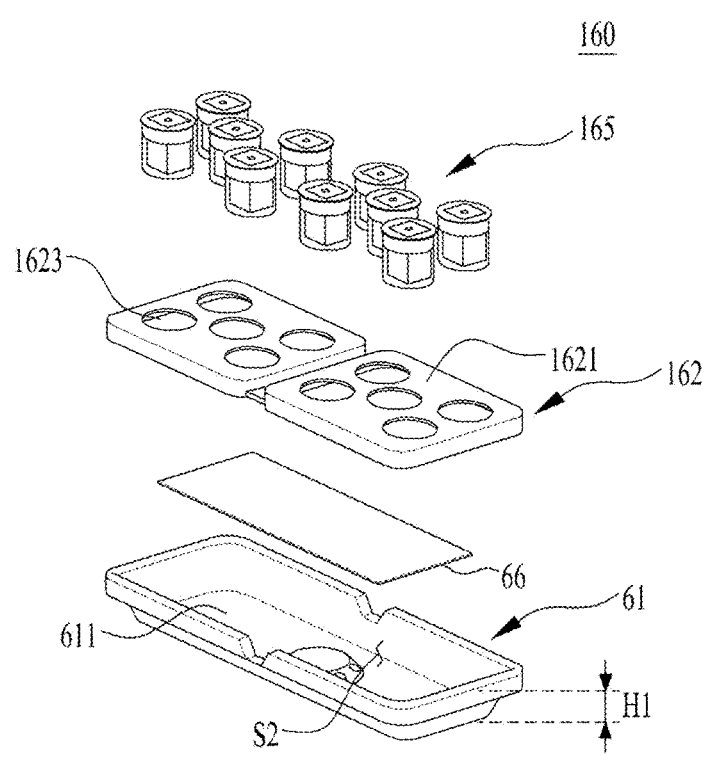
FIG. 11 is an exploded perspective view of a cultivation container according to another embodiment of the present invention.

FIG. 11 is an exploded perspective view of a cultivation container 160 according to another embodiment of the present invention. The cultivation container 160 includes a container part 61, a cover part 162, and a medium cartridge 165.

The cover part 162 covers a medium accommodation space S2 of the container part 61. The cover part 162 covers an opened upper portion of the container part 61. The cover part 162 may be coupled to the container part 61. The cover part 162 may be configured to shield the medium accommodation space S2 of the container part 61, thereby preventing the medium accommodation space S2 from being exposed to the outside of the cultivation container 60. The cover part 162 may be coupled to be press-fitted with the container part 61. However, a method for coupling the cover part 162 to the container part 61 is not intended to be limited to the proposed method.

Figure 12:
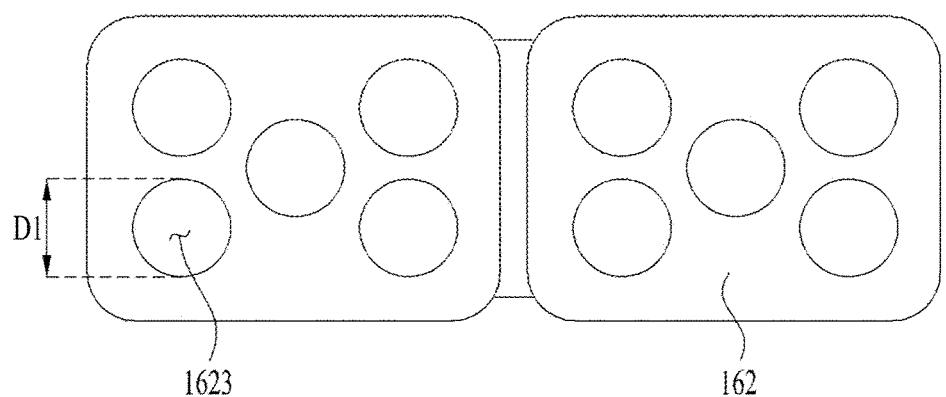
FIG. 12 is a plan view illustrating a state in which a container part and a cover part are coupled to each other.

FIG. 12 is a plan view illustrating a state in which the container part 61 and the cover part 162 are coupled to each other. This will be described with further reference to FIG. 12. A plurality of cartridge input holes 1623 are defined in a top surface 1621 of the cover part 162. The medium cartridge 165 may pass through the cover part 162 through the cartridge input hole 1623. A portion or the whole of the medium cartridge 165 passing through the cover part 162 through the cartridge input hole 1623 is accommodated in the container part 61. One medium cartridge 165 may be seated through one cartridge input hole 1623. A diameter D1 of the cartridge input hole 1623 may be less than a diameter D2 of the cartridge cover 1653 of the medium cartridge 165, which will be described later. When the cartridge cover 1653 of the media cartridge 165 is disposed on the cover part 162, the media accommodation space S2 may be covered by the cartridge cover 1653. According to another embodiment, the diameter D1 of the cartridge input hole 1623 may be the same as the diameter D2 of the cartridge cover 1653 of the medium cartridge 165, which will be described later. When the cartridge cover 1653 of the media cartridge 165 covers the cartridge input hole 1623, the media accommodation space S2 may be covered by the cartridge cover 1653.

Figure 13:
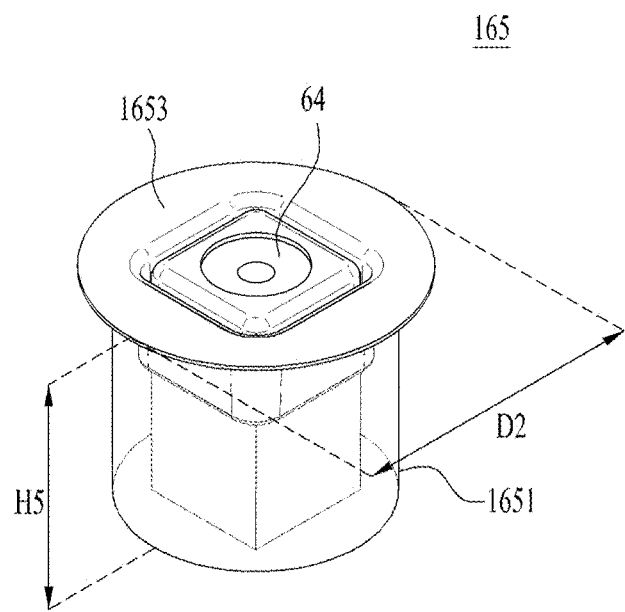
FIG. 13 is a perspective view of a medium cartridge according to an embodiment of the present invention.
Figure 14:
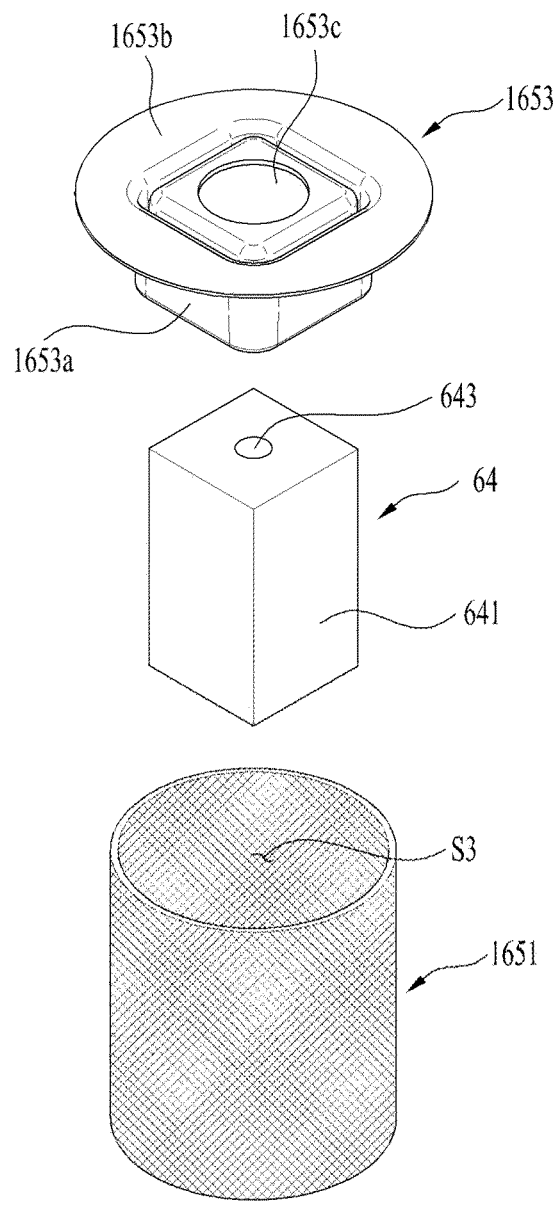
FIG. 14 is an exploded perspective view of the medium cartridge according to an embodiment of the present invention.

FIG. 13 is a perspective view of a medium cartridge 165 according to an embodiment of the present invention. FIG. 14 is an exploded perspective view of the medium cartridge 165 according to an embodiment of the present invention. The medium cartridge 165 will be described with reference to FIGS. 13 and 14.

The medium cartridge 165 includes a cartridge body 1651, a cartridge cover 1653, and a medium 64.

The cartridge body 1651 is made partially or entirely with the material of the above-described separation membrane. The separation membrane is provided as an example of a separation part. In an embodiment, the cartridge body 1651 is provided in a cylindrical shape with an opened upper portion. A sidewall of the cartridge body 1651 surrounds the medium 64. The sidewall of the cartridge body 1651 may be made with the above-described separation membrane material. The separation membrane is made of a material that allows water to pass therethrough, but may not easily pass through plant roots. For example, a mesh material may be applied as the separation membrane. A root accommodation space S3 is defined inside the cartridge body 1651. The medium 64 is accommodated in the root accommodation space S3. A height H5 of the cartridge body 1651 may be equal to a height H1 of the container part 61. Phrases such as "height is the same" and "width is the same" used in this specification do not mean exactly the same mathematically, but rather mean substantially the same, which is a concept including a tolerance, and this includes making certain differences in order to avoid the scope of rights of the present invention. In another embodiment, when the height H5 of the cartridge body 1651 is less than the height H1 of the container part 61, it is preferable that the diameter D2 of the top surface 1653b of the cartridge cover 1653, which will be described later, is greater than the diameter D1 of the cartridge input hole 1623 so that the medium cartridge 165 is supported over the cover part 162.

The cartridge cover 1653 covers the opened top surface of the cartridge body 1651. The cartridge cover 1653 includes a media accommodation part 1653a. An upper end of the medium 64 is inserted and coupled to the medium accommodation part 1653a. The media accommodation part 1653a is provided in a shape that protrudes downward by a predetermined depth from the top surface 1653b of the cartridge cover 1653. The medium accommodation part 1653a is provided in a shape that surrounds an upper side surface of the medium 64. The medium 64 is inserted into and supported by the medium accommodation part 1653a. When the medium accommodation part 1653a and the medium 64 are coupled to each other, a position of the medium 64 may be fixed at the cartridge body 1651.

A cover through-hole 1653c defined at a position corresponding to the medium 64 is defined in a top surface 1653b of the cartridge cover 1653. The cover through-hole 1653c exposes at least a portion of an upper end surface of the medium 64. The seeds embedded in the plant medium hole 643 may be germinated, and a stem of the plant may be grown toward an upper portion of the cartridge cover 1653 by passing through the cover through-hole 1653c. Thus, for smooth growth of the plants, a diameter of the cover through-hole 1653c may be defined to be larger than a diameter of the medium hole 643. That is, when viewed from the top, the cover through-hole 1653c may be defined in an expanded shape along a radial direction of the discharge hole 643. The diameter of the cover through-hole 1653c may be appropriately designed in consideration of the size of the plant being grown. A center of the cover through-hole 1653c may be provided to correspond to a center of the discharge hole 643. As a result, when the plant is germinated and grown and also is exposed to the outside of the medium 64, recognition of the plant may not be hindered by the cover through-hole 1653c.

The cartridge cover 1653 blocks the medium 64 from being exposed to the outside. For example, since the medium 64 is maintained in a wet state, when exposed to external air and light emitted by a light-emitting part (not shown), reproduction of microorganisms in the water and medium may be activated to adversely affect the growth of the plant. The cartridge cover 1653 may shield the top surface of the medium 64 to prevent the medium 64 from being exposed to the outside. As a result, an occurrence of green algae or other phenomena in the medium 64 may be reduced.

The medium accommodating space S2 of the container part 61 is divided into a plurality of root accommodating spaces S3 by a plurality of cartridge bodies 1651. Each root accommodation space S3 divided by the cartridge body 1651 shares one growth space in the medium accommodation space S2. The cartridge body 1651 serves to prevent roots from being entangled while the plants grown in each medium 64 share the growth space in the medium accommodation space S3.

the usage aspect of the described embodiment will be described. The user accommodates the plant cultivation container 160 in the plant cultivation device 1 to grow the plants. The user may move plants that have been grown for ornamental purposes to a separate pot. According to an embodiment of the present invention, the roots of crops are not tangled by the cartridge body 1651, and thus, the roots may be easily separated and transplanted individually. For example, one object may be separated from the plant cultivation container 160 simply by separating the medium cartridge 165 from the cover part 162.

In an embodiment, flower seeds may be sown in the plant cultivation containers 60 and 160. The user may cultivate flowers by accommodating the plant cultivation containers 60 and 160 in which the flower seeds are sown into the plant cultivation device 1. The flowered flowers may remain in a flowering state for more than a certain period of time, and the user may take the flowered flowers out of the plant cultivation device 1 to place the flowers like a flower pot. The user may separate the flowers that have bloomed in the plant cultivation containers 60 and 160 by the medium 64 and make various combinations. For example, in the plant cultivation containers 60 and 160 in which flowers A are sown and the plant cultivation containers 60 and 160 in which flowers B are sown, flowers A and B may be separated and combined to provide one pot. According to an embodiment of the present invention, the entanglement of the roots between the plants grown in each medium 64 is prevented, and thus, the damage of the roots may be prevented during the process of separating the plants, and also, the separation process may be simplified. In addition, since the roots are tangled, the inconvenience of processing such as root debris falling off or water dripping during the process of separating the objects may be eliminated.

Although embodiments have been described with reference to a number of illustrative embodiments thereof, it should be understood that numerous other modifications and embodiments may be devised by those skilled in the art that will fall within the spirit and scope of the principles of this disclosure.

The invention claimed is:
1. A plant cultivation container, comprising:
   a plurality of media in which a seed of a plant or at least a portion of the plant is buried;

a container having a medium accommodation space in which the plurality of media is accommodated and an open top surface;
a cover part configured to cover an open upper portion of the container; and
at least one separator that divides the medium accommodation space into a plurality of root accommodation spaces in which each of the plurality of media is accommodated and made of a water-permeable material, wherein the container includes a water hole formed on a bottom surface of the container and through which water flows in and out.

2. The plant cultivation container according to claim 1, wherein a height of the at least one separator is higher than a general height of water filled into the container.

3. A plant cultivation device, comprising:
a cabinet;
a bed provided inside of the cabinet;
a water supply configured to supply water to the bed; and
a plant cultivation container according to claim 1, which is seated on the bed and provided so that water of the bed flows into the medium accommodation space.

4. The plant cultivation container according to claim 1, further comprising a medium cover configured to cover a top surface of each of the plurality of media so as to prevent the plurality of media from being exposed to light.

5. The plant cultivation container according to claim 4, wherein the plurality of media are separable from the plant cultivation container together with the medium cover.

6. The plant cultivation container according to claim 1, wherein the at least one separator is provided in the form of a partition wall disposed between a first one of the plurality of media and a second one of the plurality of media.

7. The plant cultivation container according to claim 6, wherein the at least one separator comprises:
a first separator configured to surround a partial region of the medium accommodation space so as to define one of the plurality of root accommodation spaces; and
a plurality of second parts separators configured to connect the first separator to a wall surface of the container so as to define one or more of the plurality of root accommodation spaces.

8. The plant cultivation container according to claim 6, wherein the at least one separator extends upward from a bottom of the medium accommodation space.

9. The plant cultivation container according to claim 1, wherein each medium of the plurality of media is accommodated in a medium cartridge, wherein the medium cartridge comprises a cartridge body a portion or a whole of which is provided as the at least one separator and in which each of the plurality of media is accommodated, and wherein the cartridge body has a cylindrical shape.

10. The plant cultivation container according to claim 9, wherein a height of the cartridge body is equal to or less than a height of the container.

11. The plant cultivation container according to claim 9, further comprising a cartridge cover configured to cover a top surface of the cartridge body and having a cover through-hole.

12. The plant cultivation container according to claim 11, wherein the cartridge cover comprises a medium accommodation portion configured to surround at least a portion of the plurality of media, and wherein the plurality of media is fixed to the medium accommodation portion.

13. The plant cultivation container according to claim 11, wherein a cartridge input hole through which the medium cartridge passes is defined in the cover so that a portion or a whole of the medium cartridge is accommodated in the container.

14. The plant cultivation container according to claim 13, wherein a diameter of the cartridge input hole is equal to or less than a diameter of the cartridge cover, and wherein the medium cartridge is inserted into the cartridge input hole and supported on a top surface of the cover.

15. The plant cultivation container according to claim 9, wherein the medium cartridge is separable from the plant cultivation container.

16. A plant cultivation container, comprising:
a plurality of media in which a seed of a plant or at least a portion of the plant is buried;
a container having a medium accommodation space in which the plurality media is accommodated and an open top surface;
a cover configured to cover an open upper portion of the container; and
at least one separator disposed between a first one of the plurality of media and a second one of the plurality of media and made of a water-permeable material, wherein the container includes a water hole formed on a bottom surface of the container and through which water flows in and out.

17. The plant cultivation container according to claim 16, wherein a height of the at least one separator is higher than a general height of water filled into the container.

18. The plant cultivation container according to claim 16, further comprising a medium cover configured to cover a top surface of each of the plurality of media so as to prevent the plurality of media from being exposed to light.

19. The plant cultivation container according to claim 16, wherein each medium of the plurality of media is accommodated in a medium cartridge, wherein the medium cartridge comprises a cartridge body a portion or a whole of which is provided as the at least one separator and in which each of the plurality of media is accommodated, and wherein the cartridge body has a cylindrical shape.

20. A plant cultivation device, comprising:
a cabinet;
a bed provided inside of the cabinet;
a water supply configured to supply water to the bed; and
a plant cultivation container according to claim 16, which is seated on the bed and provided so that water of the bed flows into the medium accommodation space.

* * * * *